United States Patent
Zhu et al.

(10) Patent No.: US 10,303,822 B2
(45) Date of Patent: May 28, 2019

(54) SYSTEMS AND METHODS OF DESIGNING GEOMETRY OF TOOL SET IN A NUMERICAL SIMULATION OF SHEET METAL FORMING OPERATIONS INCLUDING SPRINGBACK COMPENSATION

(71) Applicant: Livermore Software Technology Corporation, Livermore, CA (US)

(72) Inventors: Xinhai Zhu, Pleasanton, CA (US); Li Zhang, Rochester Hills, MI (US)

(73) Assignee: Livermore Software Technology Corp., Livermore, CA (US)

(*) Notice: Subject to any disclaimer, the term of this patent is extended or adjusted under 35 U.S.C. 154(b) by 243 days.

(21) Appl. No.: 15/475,069

(22) Filed: Mar. 30, 2017

(65) Prior Publication Data
US 2018/0285488 A1    Oct. 4, 2018

(51) Int. Cl.
G06F 17/50 (2006.01)
B21D 22/22 (2006.01)
B21D 37/10 (2006.01)

(52) U.S. Cl.
CPC .......... G06F 17/5009 (2013.01); *B21D 22/22* (2013.01); *B21D 37/10* (2013.01); *G06F 2217/16* (2013.01); *G06F 2217/42* (2013.01)

(58) Field of Classification Search
CPC ..... G06F 17/5009; B21D 22/22; B21D 37/20; B21D 22/00; G06N 5/04; Y02P 90/265
USPC ........ 703/2, 5; 164/369; 156/308.2; 324/715
See application file for complete search history.

(56) References Cited

U.S. PATENT DOCUMENTS

| | | | | |
|---|---|---|---|---|
| 4,667,149 A * | 5/1987 | Cohen | ................... | G01N 25/18 324/715 |
| 5,341,303 A * | 8/1994 | Foroudastan | ............. | C22F 1/00 148/502 |
| 6,009,783 A * | 1/2000 | Taijonlahti | ............. | B21D 28/00 72/347 |
| 6,085,562 A * | 7/2000 | Daehn | ................... | B21D 26/14 72/430 |
| 8,280,708 B2 * | 10/2012 | Kubli | ................. | G05B 19/4069 700/98 |
| 8,551,281 B2 * | 10/2013 | Kazeoka | ................. | B32B 5/142 156/309.6 |
| 9,557,007 B2 * | 1/2017 | Appleyard | ............. | B21D 55/00 |

(Continued)

*Primary Examiner* — Thai Q Phan
(74) *Attorney, Agent, or Firm* — Roger H. Chu

(57) ABSTRACT

Systems and methods of designing geometry of a tool set in a numerical simulation of sheet metal forming operations including springback compensation are disclosed. Computerized die face model representing an initial geometry of a tool set is generated for forming a sheet metal work-piece to a part's desired geometry. Numerically-simulated deep drawing operation, optional trimming operation and a springback effect are conducted to obtained a trial geometry of the part. A deviation between the trial geometry and the desired geometry is obtained. When the deviation is outside of tolerance, computerized die face model is regenerated according to a modified geometry of the tool set that includes an estimated amount of springback compensation derived from the deviation due to springback together with a node adjustment scheme for ensuring model conformity along the boundary line. Final modified geometry of the tool set is iteratively obtained.

20 Claims, 13 Drawing Sheets

(56) References Cited

U.S. PATENT DOCUMENTS

| | | | | |
|---|---|---|---|---|
| 2004/0148230 | A1* | 7/2004 | Matsui | G06Q 30/02 |
| | | | | 705/26.4 |
| 2006/0287755 | A1* | 12/2006 | Kubli | G05B 19/4069 |
| | | | | 700/145 |
| 2009/0133830 | A1* | 5/2009 | Kazeoka | B32B 5/142 |
| | | | | 156/308.2 |
| 2010/0332017 | A1* | 12/2010 | Stummer | B29C 45/76 |
| | | | | 700/200 |
| 2011/0189440 | A1* | 8/2011 | Appleby | B22C 9/04 |
| | | | | 428/156 |
| 2016/0008883 | A1* | 1/2016 | Vivek | B22F 3/087 |
| | | | | 419/66 |
| 2016/0082502 | A1* | 3/2016 | Appleby | B22C 9/04 |
| | | | | 164/369 |
| 2017/0211200 | A1* | 7/2017 | Winn | C25D 11/022 |
| 2018/0285487 | A1* | 10/2018 | Wilcox | G06F 17/5009 |

* cited by examiner

SYSTEMS AND METHODS OF DESIGNING GEOMETRY OF TOOL SET IN A NUMERICAL SIMULATION OF SHEET METAL FORMING OPERATIONS INCLUDING SPRINGBACK COMPENSATION

FIELD

The invention generally relates to numerical simulation of sheet metal forming operations, more particularly to systems and methods of designing geometry of a tool set in a numerical simulation of sheet metal forming operations including effects of springback compensation.

BACKGROUND

Sheet metal forming has been used in the industry for years for creating metal parts from a blank sheet metal, for example, automobile manufacturers and their suppliers produce many parts using sheet metal forming.

One of the most used sheet metal forming processes is deep drawing, which involves a hydraulic, mechanical or servo press pushing a specially-shaped punch into a matching die (i.e., part of a tool set) with a piece of blank sheet metal (i.e., work-piece) in between. Example products made from this process include, but are not limited to, car hood, fender, door, automotive fuel tank, kitchen sink, aluminum can, etc.

Product surface contains the desired pattern/shape of a sheet metal part at the end of the deep drawing process. During the deep drawing operation, binder is used for holding the work-piece. After the work-piece is shaped by the tool set (i.e., punch and matching die), unwanted portion of the work-piece is cut out along the trim lines if required. Any trim line located along the periphery of the product surface becomes boundary line. At this point, the work-piece experiences a phenomena or effect referred to as springback to a permanently deformed geometry. The springback effect includes physical phenomena of the elastic deformation being released while the plastic deformation stays. In order to produce a part properly and economically to a desired geometry, it is critical to design a tool set in a configuration that a part can be produced without further modifications.

To achieve the compensation of springback, overbending of the sheet metal work-piece is generally required. Prior art approaches has been a trial-and-error method of modifying the physical die. With the computer aided engineering, numerical simulations of this trial-and-error approach have been used. However, there are problems in automated numerical simulation of iteratively modifying a tool set. For example, in certain situation, convergence cannot be obtained in a numerical simulation due to errors in a computer generated model of the tool set particularly along the boundary line. It would therefore be desirable to have improved methods of designing geometry of a tool set in a numerical simulation of sheet metal forming operations including effects of springback compensation.

BRIEF SUMMARY

This section is for the purpose of summarizing some aspects of the invention and to briefly introduce some preferred embodiments. Simplifications or omissions may be made to avoid obscuring the purpose of the section. Such simplifications or omissions are not intended to limit the scope of the invention.

Systems and methods of designing geometry of a tool set in a numerical simulation of sheet metal forming operations including effects of springback compensation are disclosed. According to one aspect of the disclosure, an improved method comprises steps or actions or operations as follows:

(A) generating a computerized die face model representing an initial geometry of a tool set for forming a sheet metal work-piece to a part, the computerized die face model containing a plurality of nodes connected by a plurality of rigid elements.

(B) conducting a numerically simulated deep drawing operation for using the computerized die face model to numerically deform the sheet metal work-piece according to the tool set's current geometry;

(C) conducting a numerically simulated trimming operation for trimming off unwanted portions of the deformed sheet metal work-piece if required;

(D) conducting a numerical springback simulation for obtaining a trial geometry of the part, the trial geometry includes a springback effect either of the deformed sheet metal work-piece or of the trimmed deformed sheet metal work-piece if the trimming operation is required;

(E) determining a deviation due to springback by comparing the trial geometry to the part's desired geometry;

(F) when the deviation due to springback is outside of a predetermined tolerance, regenerating the computerized die face model based on a modified geometry of the tool set that includes an estimated amount of springback compensation derived from the deviation together with a node adjustment scheme for ensuring model conformity along the boundary line of the part; and (G) repeating actions (B)-(F) unless the deviation due to springback is within the predetermined tolerance.

According to another aspect, an example node adjustment scheme comprises: moving an existing node determined to be in close proximity of the boundary line to be aligned with the boundary line based on a close proximity criterion; adding new nodes at each intersection between the boundary line and an edge of a rigid element; and splitting each rigid element that is dissected by any one of the boundary line.

According to yet another aspect, an example close proximity criterion includes: calculating a reference distance between the existing node and the boundary line; determining a shortest dimension between the existing node and all neighboring nodes; and when the reference distance is less than a predefined percentage of the shortest dimension, designating the existing node to be located within close proximity of the boundary line.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Additionally, used herein, the terms "horizontal", "vertical", "upper", "lower", "top", "bottom", "right", "left", "front", "back", "rear", "side", "middle", "upwards", and "downwards" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Embodiments of the invention are discussed herein with reference to FIGS. 1A-8. However, those skilled in the art will readily appreciate that the detailed description given herein with respect to these figures is for explanatory purposes as the invention extends beyond these limited embodiments.

The invention is directed to an improved method of creating a computerized numerical model representing addendum section. The computerized numerical model is suitable for a computer simulation of a sheet metal forming process using computer aided engineering analysis (e.g., finite element analysis).

Figure 1A:
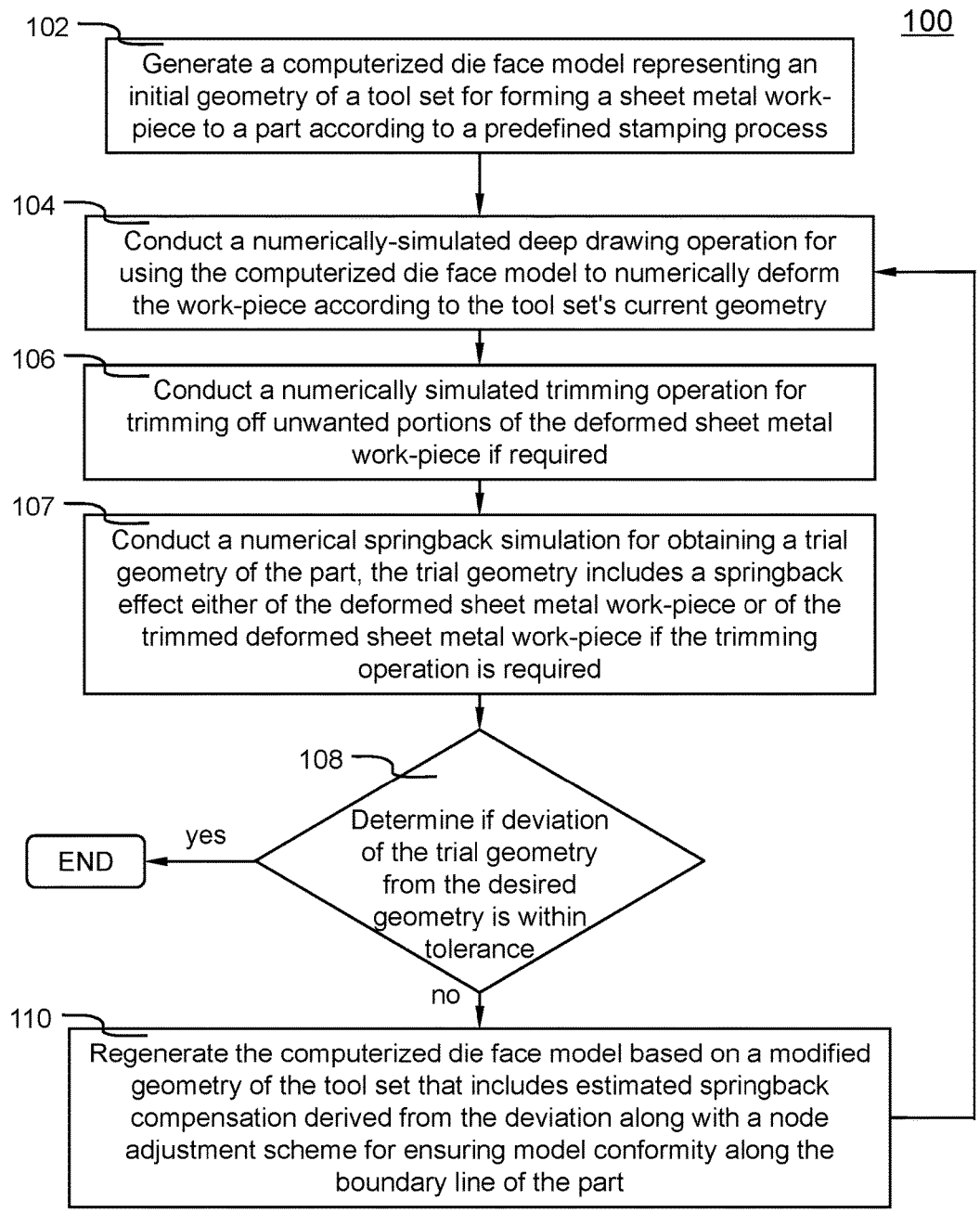
FIG. 1A is a flowchart illustrating an example process of designing geometry of a tool set in a numerical simulation of sheet metal forming operations including effects of springback compensation, according to an embodiment of the invention.

Referring first to FIG. 1A, it is shown an example process 100 of designing geometry of a tool set in a numerical simulation of sheet metal forming operations including effects of springback compensation. Process 100 may be implemented in software and preferably understood with other figures.

Figure 8:
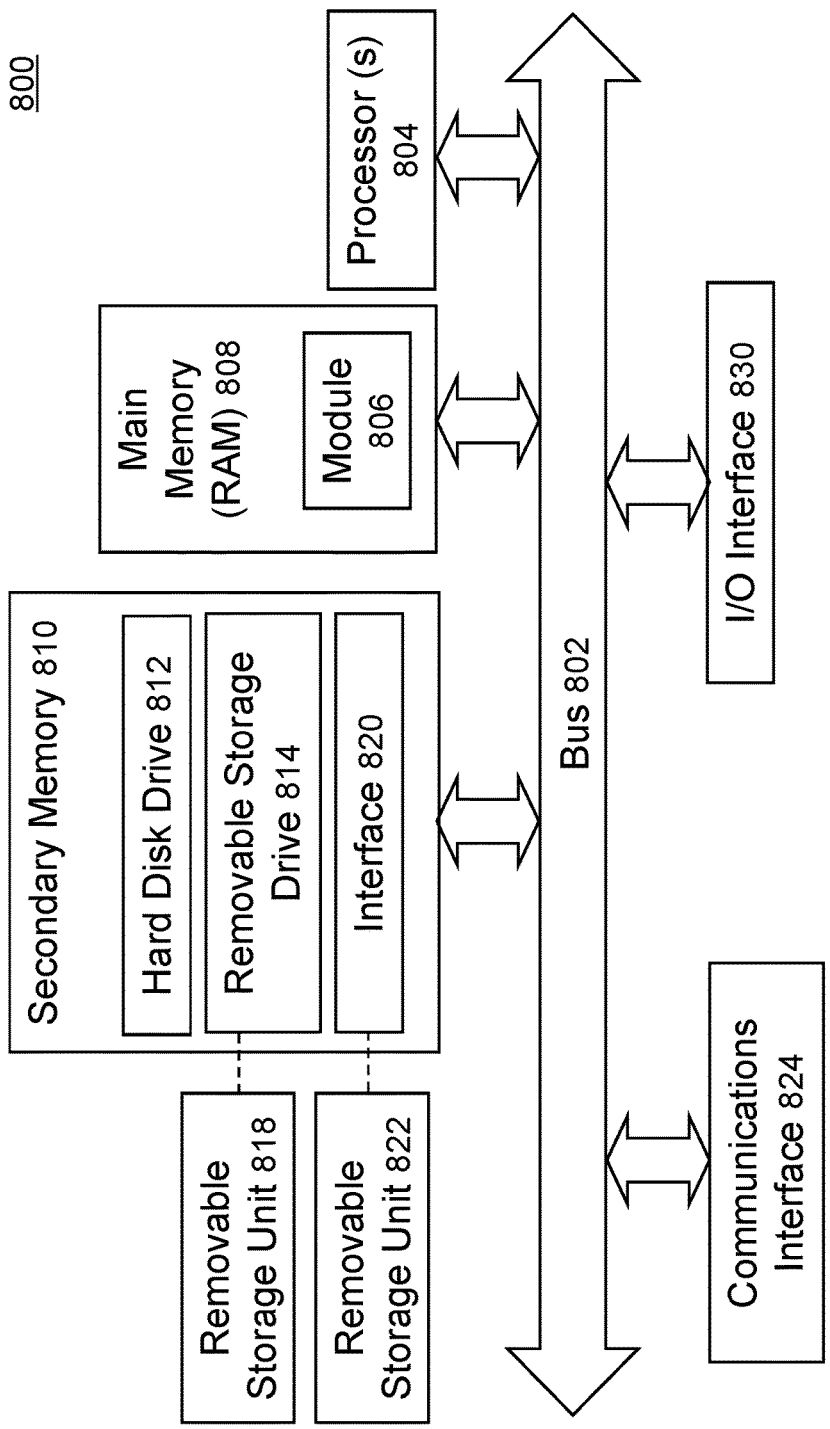
FIG. 8 is a functional block diagram showing salient components of an example computer, in which an embodiment of the invention may be implemented.

Process 100 starts at action 102 by generating a computerized die face model representing an initial geometry of a tool set to be used for forming a sheet metal work-piece to a part that has a desired geometry according to a predefined metal forming process with an application module (e.g., finite element analysis module) installed on a computer system (e.g., computer 800 of FIG. 8).

The initial geometry can be the desired geometry, which is a given information (e.g., an input to the application module from a user). The initial geometry can also be a different geometry that include certain amounts of springback compensation based on prior experience, expertise, etc. Computerized die face model represents the tool set that is relatively rigid comparing to the sheet metal work-piece. As a result, the computerized die face model contains a number of nodes connected by a number of rigid elements, which can be either triangular elements and/or quadrilateral elements. Due to the rigid nature of the tool set, the computerized die face model does not need to be refined.

Next, at action 104, a numerically-simulated deep drawing operation is conducted. The numerical simulation deforms a sheet metal blank (i.e., work-piece before any deformation) according to current geometry of the computerized die face model (i.e., tool set). It is noted that the current geometry is the initial geometry in the first iteration of process 100. As a result, the sheet metal work-piece is deformed to the current geometry of the computerized die face model at the end of deep drawing operation.

At action 106, an optional trimming operation is numerically simulated for removing unwanted portion(s) of the deformed sheet metal work-piece if required. The trimming operation trims off the unwanted portion(s) along at least one trim line. Any trim line along the periphery of the part becomes boundary line.

At action 107, a numerical simulation of springback is conducted for obtaining a trial geometry of the part. The trial geometry includes springback effect either of the deformed sheet metal work-piece or of the trimmed deformed sheet metal work-piece if the trimming operation is required.

Figure 2:
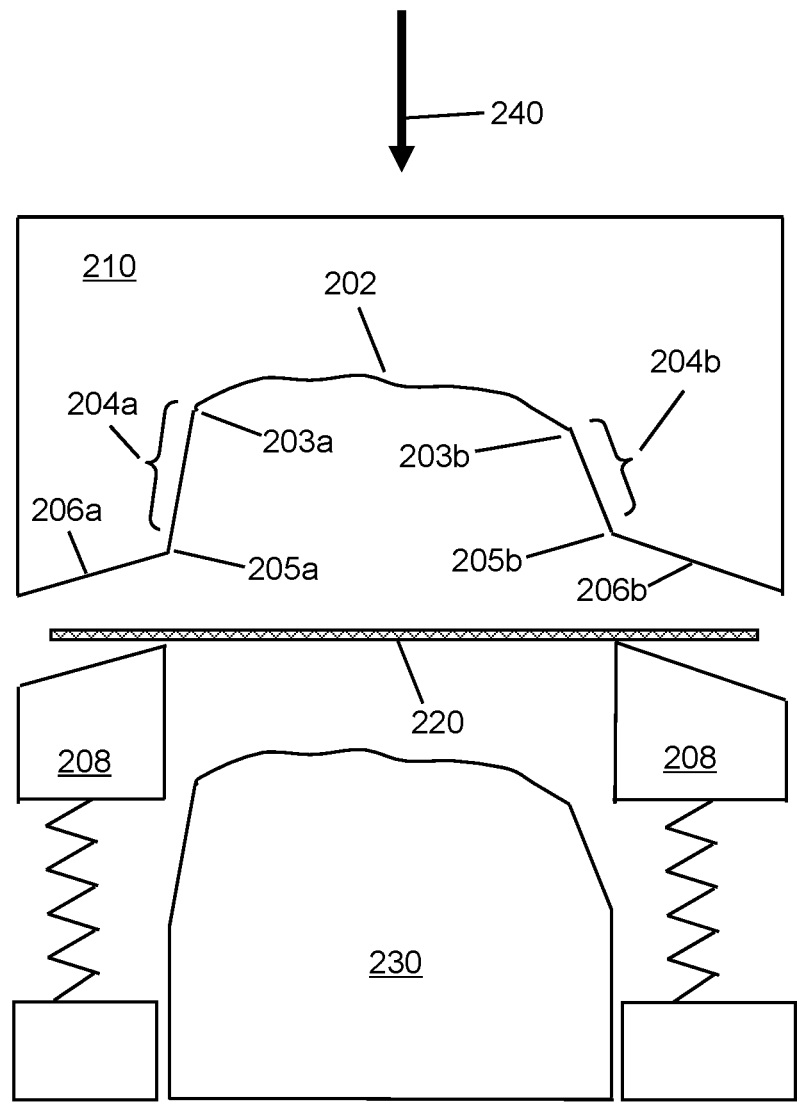
FIG. 2 is a simplified elevation view showing a cross-section profile of an example set up of a draw die for deep draw manufacturing of a sheet metal part according to an embodiment of the invention.

In order to understand metal forming operations, FIG. 2 shows an elevation view of cross-section of an example setup of a deep drawing operation. A blank sheet metal 220 (i.e., an unformed sheet metal plate before being formed also known as work-piece) rests on a blank holder 208 between an upper die cavity 210 and a punch 230. The sheet metal work-piece 220 is formed into a part when the die 210 is pushed down to the punch 230 in the direction of the draw axis (shown by an arrow 240). The die 210 has a product design section 202, binder section 206*a-b* and addendum section 204*a-b*. The border between the addendum section 204*a-b* and the product design surface section 202 is referred to as the boundary line 203*a-b*, while the direct intersection between the addendum sections 204*a-b* and the binder section 206*a-b* is referred to as theoretical punch opening line 205*a-b*. If trimming operation is required to remove unwanted portion(s) of the work-piece, the work-piece is trimmed off along all trim lines. Any trim line along the periphery of the part becomes the boundary line.

Figure 3A:
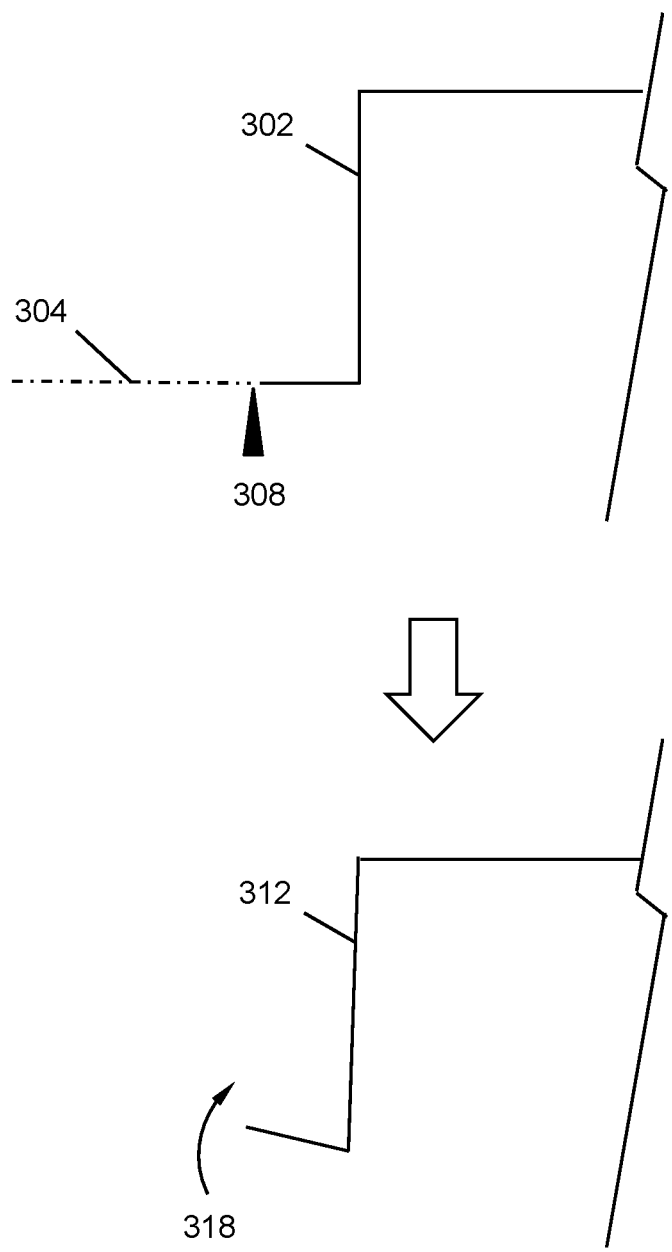
FIGS. 3A-3B are diagrams illustrating cross-sectional profiles of example springback effect and springback compensation in accordance with one embodiment of the invention.
Figure 3B:
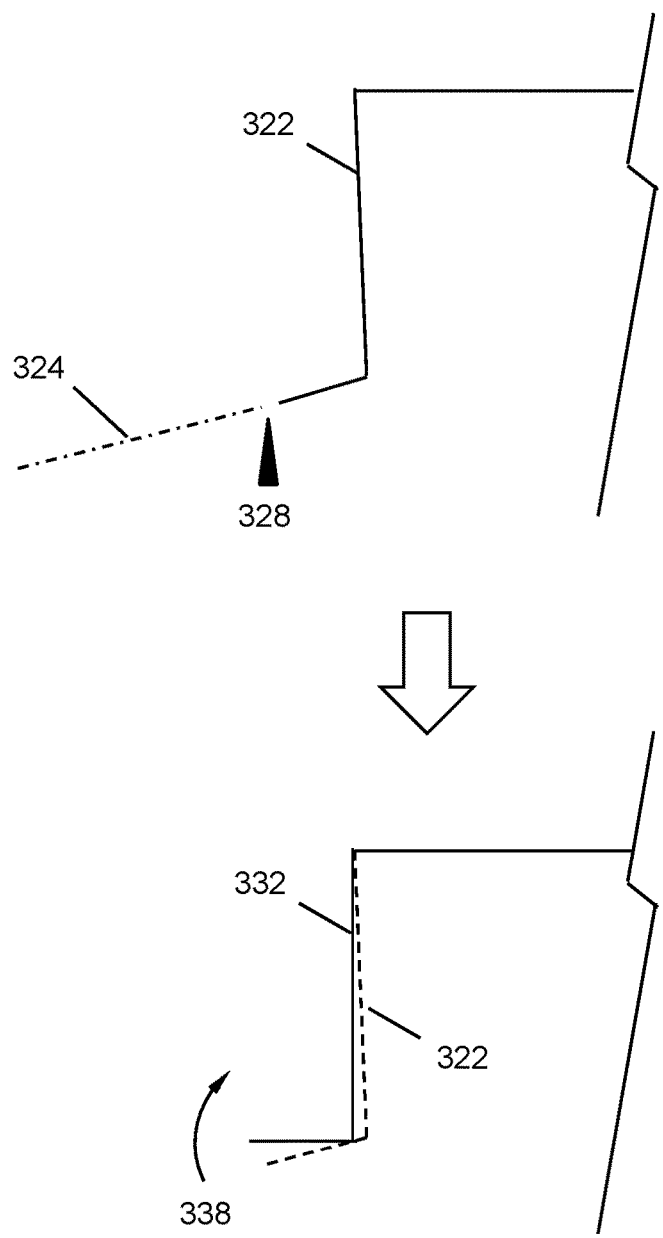

FIG. 3A shows an elevation view of a profile of a sheet metal work-piece is formed into a geometry 302 of a tool set (e.g. initial geometry). After the tool set is released and the unwanted portion 304 is trimmed off along trim line 308, the deformed geometry 312 shows the effect of springback (shown as a rotation 318). If the geometry 302 is the desired geometry, the tool set's geometry must be modified to compensate the springback. As shown in FIG. 3B, a modified geometry including estimated springback compensation 322 is formed and the unwanted portion 324 is trimmed off along trim line 328. Deformed geometry 332 is resulted after springback 338. Trimming operation is performed only if it is required. In another embodiment, there is no unwanted portion 304, 324 thereby no trim line 308, 328.

Referring back to FIG. 1A, test 108 determines whether deviation of the deformed geometry from the desired geometry is within a predefined tolerance. When test 108 is not true, process 100 moves to action 110 to regenerate the computerized die face model based a modified geometry that includes an estimated amount of springback compensation, which is derived from the deviation between the trial geometry and the desired geometry. In one embodiment, the estimated springback compensation can contain a portion or entire negative amount of the current deviation. In additional, the regeneration of the computerized die face model includes a node adjustment scheme for ensuring model conformity along the boundary. Then process 100 follows the "yes" branch to repeat actions 104-107 and test 108 until test 108 becomes true. Process 100 follows the "no" branch to end at that point.

Figure 4A:
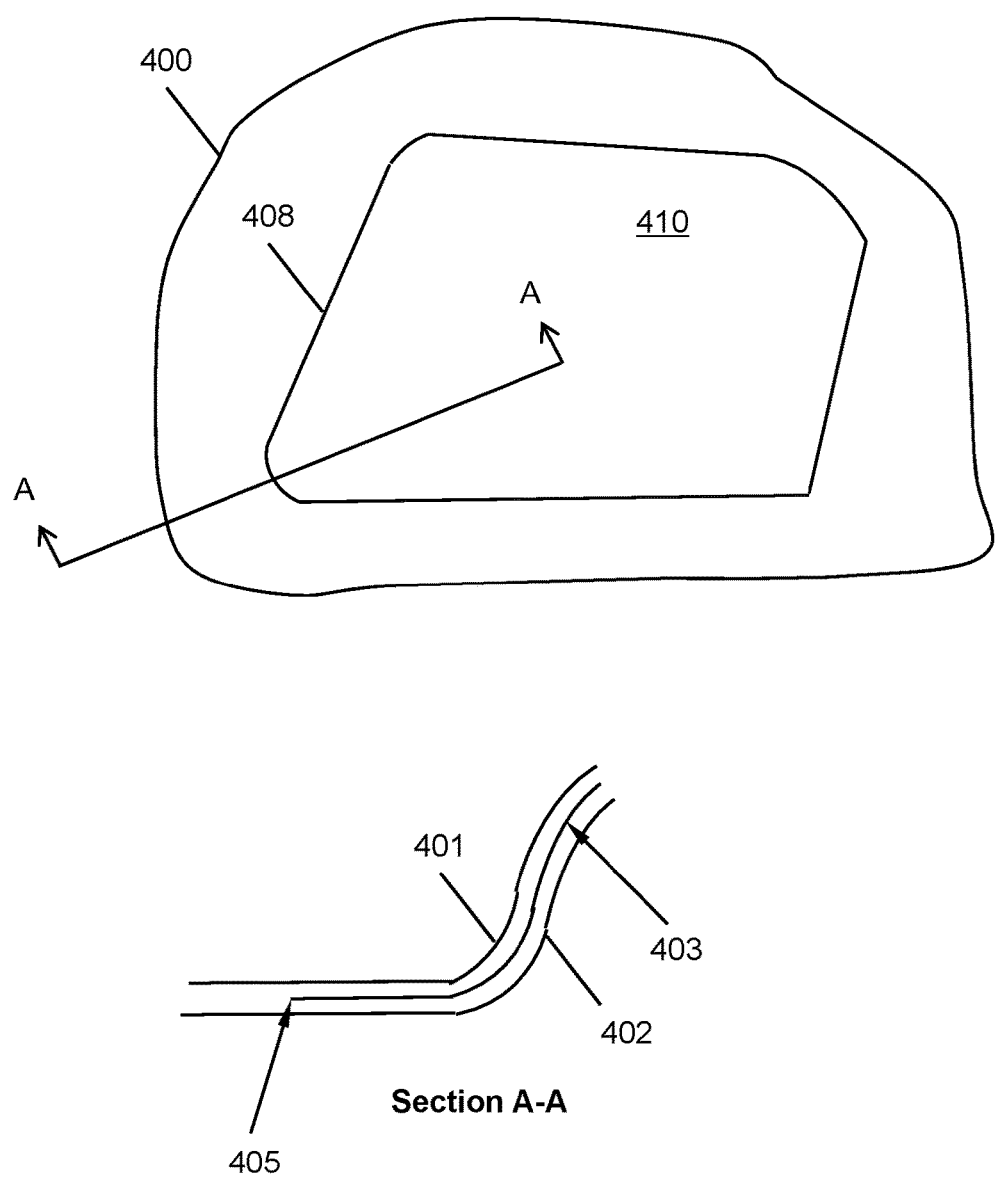
FIG. 4A is a diagram showing a simplified top plan view of an example sheet metal forming and a cross-sectional view of a sheet metal work-piece in between a tool set after metal forming operations including a trimming operation, according to an embodiment of the invention.
Figure 4B:
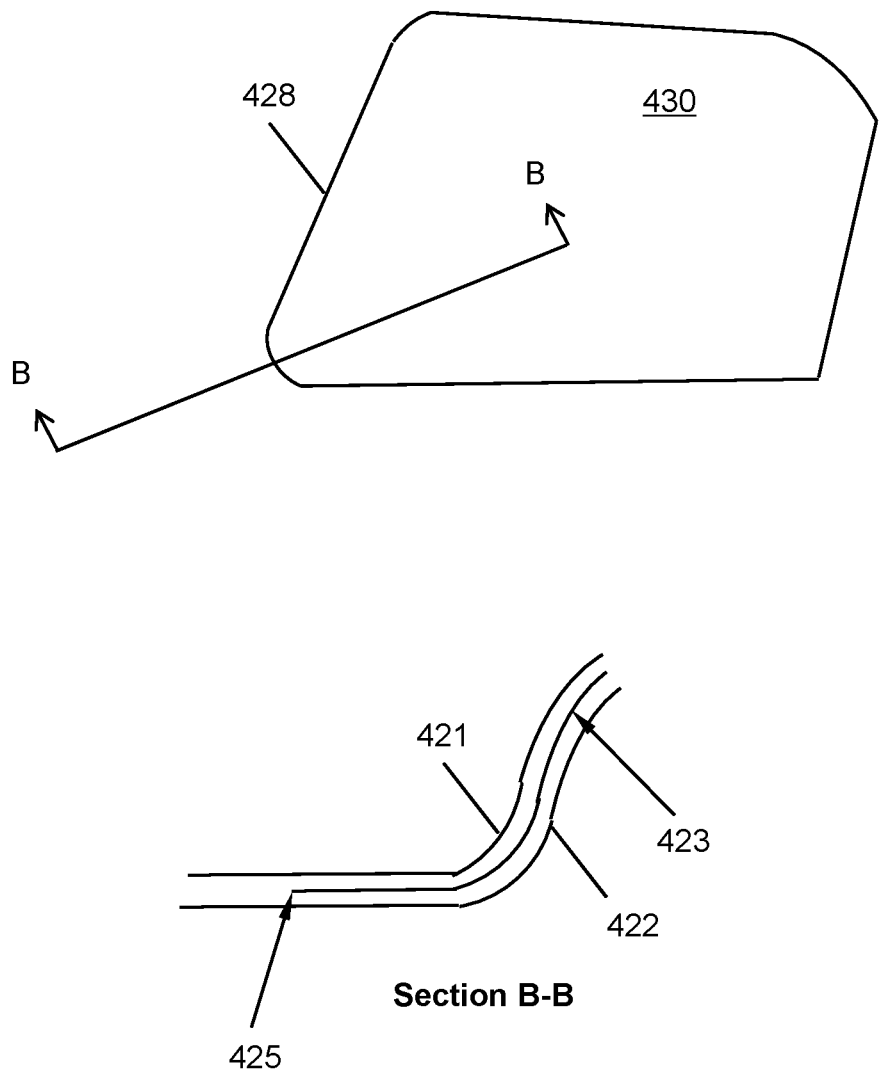
FIG. 4B is a diagram showing a simplified top plan view of another example sheet metal forming and a cross-sectional view of a sheet metal work-piece in between a tool set after metal forming operations, according to an embodiment of the invention.

FIG. 4A shows a simplified plan view of a sheet metal work-piece 400. Product surface 410 is within the boundary line 408. In the section view A-A, it shows the die 401 and matching punch 402 with the trimmed work-piece 403 in between. Free edge 405 of the work-piece 403 is along the boundary line 408 which can be a trim line if trimming operation is required. Another example without trimming operation is shown in FIG. 4B. A sheet metal work-piece 430 is the product surface with a boundary line 428. In the section view B-B, it is shown the die 421 and matching punch 422 with the work-piece 423 located in between. Free edge 425 of the work-piece 430 is along the boundary line 428.

Figure 5A:
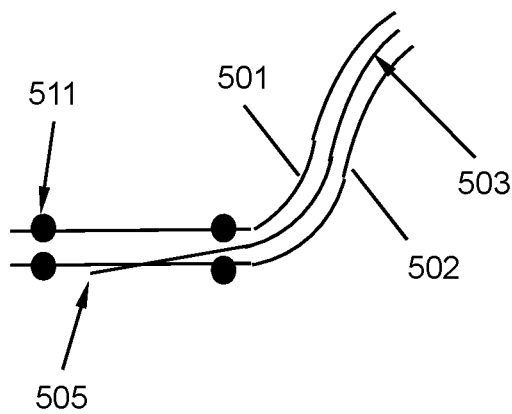
FIGS. 5A-5C are diagrams showing an example node adjustment scheme used in regenerating computerized die face model to ensure model conformity, according to an embodiment of the invention.
Figure 5B:
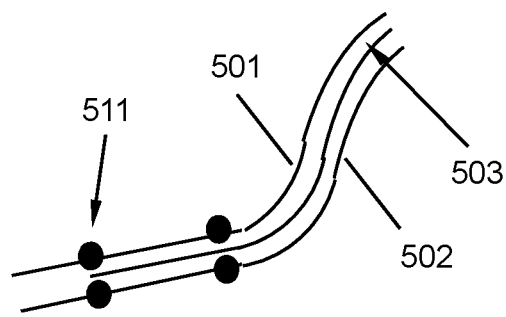
Figure 5C:
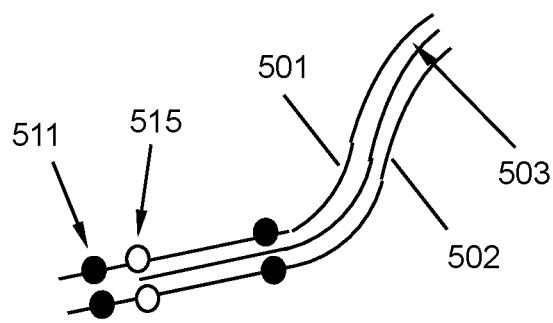

In certain instances, when the computerized die face model is regenerated in action 110, the computerized die face model is not conformed with the free edge 505 as shown in FIG. 5A. With node adjustment scheme of moving existing node(s) 511 to be aligned with the free edge along the boundary line, the conformity at free edge is ensured as shown in FIG. 5B. In another embodiment, the model conformity is achieved by adding node 515 at the intersection between the boundary line and an edge of a rigid element shown in FIG. 5C.

Figure 1B:
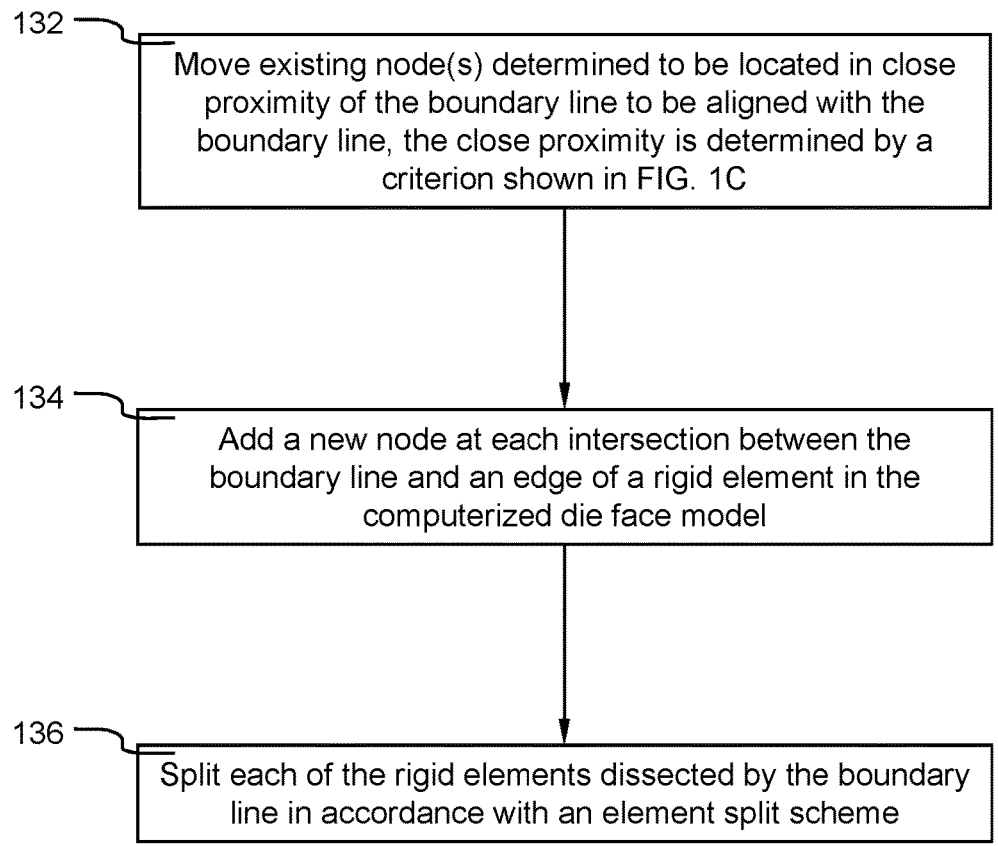
FIG. 1B is a flowchart illustrating an example process of node adjustment scheme in accordance with an embodiment of the invention.
Figure 1C:
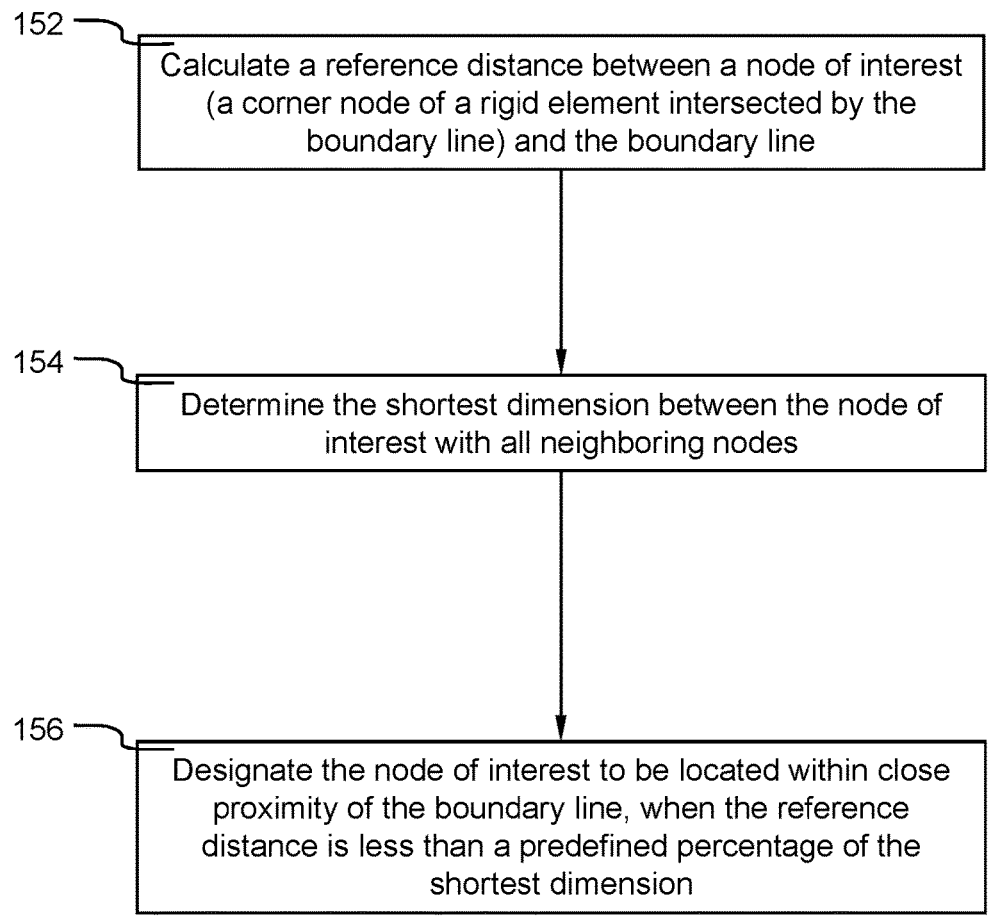
FIG. 1C is a flowchart showing an example process of close proximity criterion in accordance with an embodiment of the invention.

FIG. 1B shows an example node adjustment scheme 130, which starts at action 132 by moving existing nodes that are determined to be located within close proximity of the boundary line to be aligned with the boundary line. The close proximity determination criterion is described in FIG. 1C and FIG. 6A.

Figure 6A:
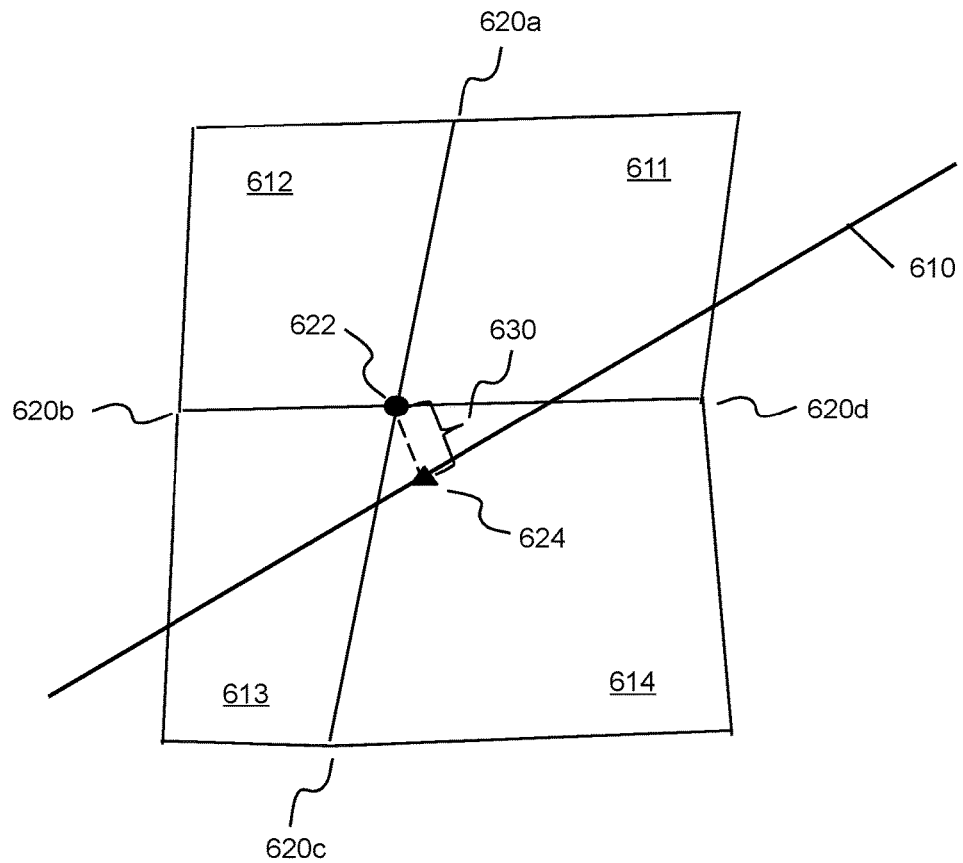
FIGS. 6A-6B are diagrams showing an example node adjustment scheme, according to an embodiment of the invention.

FIG. 6A is a diagram depicting four example rigid quadrilateral elements 611-614 intersected by a particular segment of the boundary line 610. An example close proximity determination criterion 150 shown in FIG. 1C starts at action 152. A reference distance 630 between any node of interest (e.g., a corner node 622 of a rigid element 611) and the boundary line 610 is calculated. For example, the reference distance 630 is measured between the node of interest 622 and its normal projection location 624 to the boundary line 610. Next, at action 154, the shortest dimension between the node of interest 622 and all neighboring nodes 620*a*-620*d* of rigid elements 611-614 defined with the node of interest 622 is determined. In the example shown in FIG. 6A, the shortest dimension is between node 622 and 620*b*. At action 156, the node of interest 622 is designated as being located within close proximity of the boundary line 610 when the reference distance 630 is less than a predefined percentage of the shortest dimension. One example predefined percentage is set at 25%.

Figure 6B:
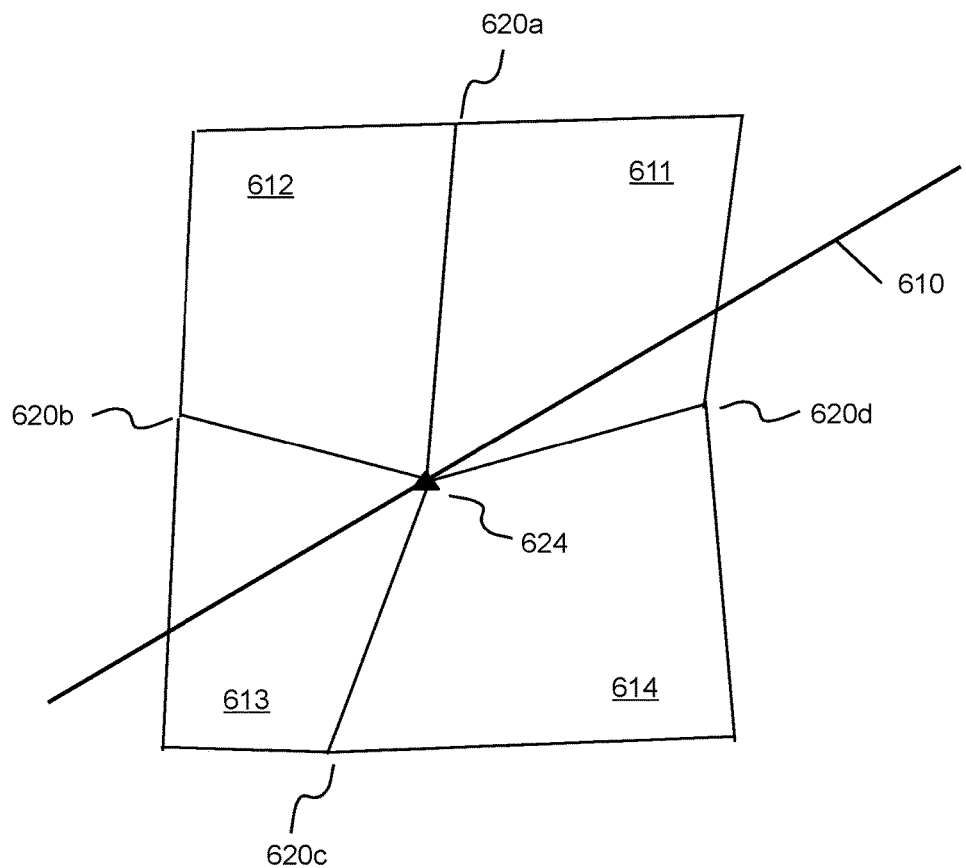

Once a node is determined to be located within close proximity of the boundary line, the node is moved to be aligned with the boundary line, for example, node 622 is moved to the normal projection location 624 on the boundary line 610. Modified rigid elements 611-614 after the node adjustment are shown in FIG. 6B.

Referring back to FIG. 1B, next at action 134, new nodes are added to intersections and respective edges of the rigid elements in the computerized die face model after the nodal adjustment at action 132. Then, at action 136, the computerized die face model is updated by splitting each rigid element having added node or nodes in accordance with an element splitting scheme. Example element splitting schemes are shown in FIGS. 7A-7F.

Figure 7A:
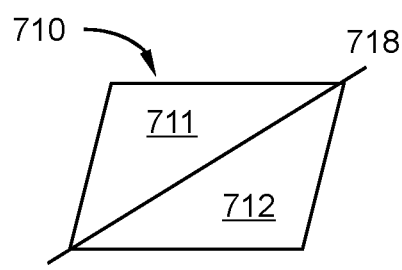
FIGS. 7A-7F are diagrams showing example element split schemes after nodes are added to intersection between a particular boundary line and an edge of a rigid element, according to another embodiment of the invention.
Figure 7B:
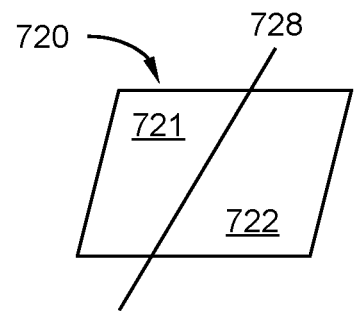
Figure 7C:
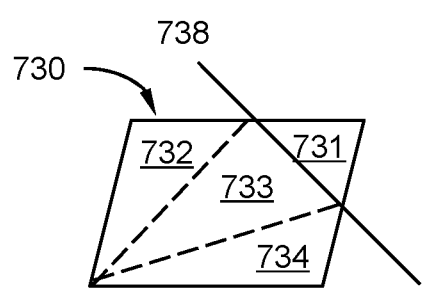
Figure 7D:
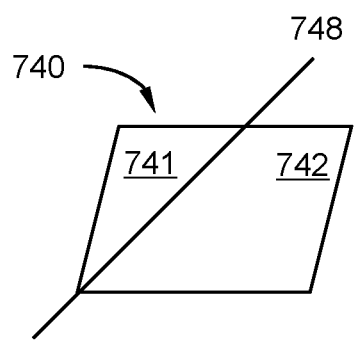

In FIG. 7A, a first rigid quadrilateral element 710 is split to two triangular elements 711-712 by boundary line 718. In FIG. 7B, a second rigid quadrilateral element is split to two quadrilateral elements 721-722 by boundary line 728. In FIG. 7C, a third rigid quadrilateral element 730 is partitioned to four triangular elements 731-734 by boundary line 738 and two additional internal lines. In FIG. 7D, a fourth rigid quadrilateral element 740 is split to one triangular element 741 and a quadrilateral element 742 by boundary line 748.

Figure 7E:
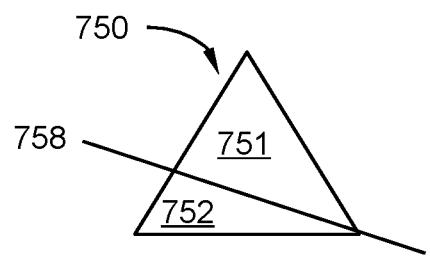
Figure 7F:
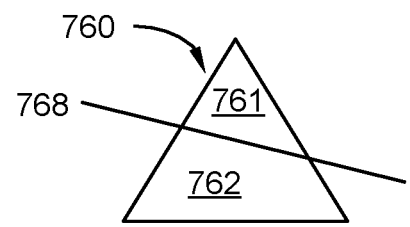

In FIG. 7E, a first triangular rigid element 750 is split to two triangular elements 751-752 by boundary line 758. In FIG. 7F, a second triangular rigid element 760 is split to one triangular element 761 and one quadrilateral element 762 by boundary line 768.

Node adjustment scheme is applied only once in the first regeneration of the computerized die face model. Once adjusted, the model would be conform at free edges along the boundary line for all further iterations.

According to one aspect, the invention is directed towards one or more computer systems capable of carrying out the functionality described herein. An example of a computer system 800 is shown in FIG. 8. The computer system 800 includes one or more processors, such as processor 804. The processor 804 is connected to a computer system internal communication bus 802. Various software embodiments are described in terms of this example computer system. After reading this description, it will become apparent to a person skilled in the relevant art(s) how to implement the invention using other computer systems and/or computer architectures.

Computer system 800 also includes a main memory 808, preferably random access memory (RAM), and may also include a secondary memory 810. The secondary memory 810 may include, for example, one or more hard disk drives 812 and/or one or more removable storage drives 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar means for allowing computer programs or other instructions to be loaded into computer system 800. Such means may include, for example, a removable storage unit 822 and an interface 820. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 822 and interfaces 820 which allow software and data to be transferred from the removable storage unit 822 to computer system 800. In general, Computer system 800 is controlled and coordinated by operating system (OS) software, which performs tasks such as process scheduling, memory management, networking and I/O services.

There may also be a communications interface 824 connecting to the bus 802. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical, or other signals capable of being received by communications interface 824. The computer 800 communicates with other computing devices over a data network based on a special set of rules (i.e., a protocol). One of the common protocols is TCP/IP (Transmission Control Protocol/Internet Protocol) commonly used in the Internet. In general, the communication interface 824 manages the assembling of a data file into smaller packets that are transmitted over the data network or reassembles received packets into the original data file. In addition, the communication interface 824 handles the address part of each packet so that it gets to the right destination or intercepts packets destined for the computer 800. In this document, the terms "computer program medium" and "computer usable medium" are used to generally refer to media such as removable storage drive 814, and/or a hard disk installed in hard disk drive 812. These computer program products are means for providing software to computer system 800. The invention is directed to such computer program products.

The computer system 800 may also include an input/output (I/O) interface 830, which provides the computer system 800 to access monitor, keyboard, mouse, printer, scanner, plotter, and alike.

Computer programs (also called computer control logic) are stored as application modules 806 in main memory 808 and/or secondary memory 810. Computer programs may also be received via communications interface 824. Such computer programs, when executed, enable the computer system 800 to perform the features of the invention as discussed herein. In particular, the computer programs, when executed, enable the processor 804 to perform features of the invention. Accordingly, such computer programs represent controllers of the computer system 800.

In an embodiment where the invention is implemented using software, the software may be stored in a computer program product and loaded into computer system 800 using removable storage drive 814, hard drive 812, or communications interface 824. The application module 806, when executed by the processor 804, causes the processor 804 to perform the functions of the invention as described herein.

The main memory 808 may be loaded with one or more application modules 806 that can be executed by one or more processors 804 with or without a user input through the I/O interface 830 to achieve desired tasks. In operation, when at least one processor 804 executes one of the application modules 806, the results are computed and stored in the secondary memory 810 (i.e., hard disk drive 812). The status of the computer simulation of sheet metal forming process (e.g., finite element analysis results) is reported to the user via the I/O interface 830 either in a text or in a graphical representation.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas many simplified figures have been used, these simplified figures are for illustration simplicity. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A method of numerically designing geometry of a tool set in a numerical simulation of sheet metal forming operations including effects of springback compensation comprising:

(A) generating, with an application module installed on a computer system, a computerized die face model representing an initial geometry of a tool set for forming a sheet metal work-piece to a part, the computerized die face model containing a plurality of nodes connected by a plurality of rigid elements;

(B) conducting, with the application module, a numerically simulated deep drawing operation for using the computerized die face model to numerically deform the sheet metal work-piece according to a current geometry of the tool set;

(C) conducting, with the application module, a numerically simulated trimming operation for trimming off unwanted portions of the deformed sheet metal work-piece if required;

(D) conducting, with the application module, a numerical springback simulation for obtaining a trial geometry of the part, the trial geometry includes a springback effect either of the deformed sheet metal work-piece or of the trimmed deformed sheet metal work-piece if the trimming operation is required;

(E) determining, with the application module, a deviation due to springback by comparing the trial geometry to the part's desired geometry;

(F) when the deviation due to springback is outside of a predetermined tolerance, regenerating, with the application module, the computerized die face model based on a modified geometry of the tool set that includes an estimated amount of springback compensation derived from the deviation together with a node adjustment scheme for ensuring model conformity along a boundary line of the part; and (G) repeating actions (B)-(F) unless the deviation due to springback is within the predetermined tolerance.

2. The method of claim 1, wherein the estimated amount of springback compensation comprises an opposite amount of the deviation due to springback.

3. The method of claim 1, wherein the node adjustment scheme comprises moving an existing node determined to be in close proximity of the boundary line to be aligned with the boundary line based on a close proximity criterion.

4. The method of claim 3, wherein the close proximity criterion includes:
calculating a reference distance between the existing node and the boundary line;
determining a shortest dimension between the existing node and all neighboring nodes; and
when the reference distance is less than a predefined percentage of the shortest dimension, designating the existing node to be located within close proximity of the boundary line.

5. The method of claim 3, wherein the node adjustment scheme further comprises adding new nodes at each intersection between the boundary line and an edge of a rigid element.

6. The method of claim 5, wherein the node adjustment scheme further comprises splitting each rigid element that is dissected by the boundary line.

7. The method of claim 1, wherein the initial geometry comprises the part's desired geometry.

8. A system for designing geometry of a tool set in a numerical simulation of sheet metal forming operations including effects of springback compensation comprising:
an input/output (I/O) interface;
a memory for storing computer readable code for at least one application module;
at least one processor coupled to the memory, said at least one processor executing the computer readable code in the memory to cause the at least one application module to perform operations of:
(A) generating a computerized die face model representing an initial geometry of a tool set for forming a sheet metal work-piece to a part, the computerized die face model containing a plurality of nodes connected by a plurality of rigid elements;
(B) conducting a numerically simulated deep drawing operation for using the computerized die face model to numerically deform the sheet metal work-piece according to a current geometry of the tool set;
(C) conducting a numerically simulated trimming operation for trimming off unwanted portions of the deformed sheet metal work-piece if required;
(D) conducting a numerical springback simulation for obtaining a trial geometry of the part, the trial geometry includes a springback effect either of the deformed sheet metal work-piece or of the trimmed deformed sheet metal work-piece if the trimming operation is required;
(E) determining a deviation due to springback by comparing the trial geometry to the part's desired geometry;

(F) when the deviation due to springback is outside of a predetermined tolerance, regenerating the computerized die face model based on a modified geometry of the tool set that includes an estimated amount of springback compensation derived from the deviation together with a node adjustment scheme for ensuring model conformity along a boundary line of the part; and (G) repeating actions (B)-(F) unless the deviation due to springback is within the predetermined tolerance.

9. The system of claim 8, wherein the estimated amount of springback compensation comprises an opposite amount of the deviation due to springback.

10. The system of claim 8, wherein the node adjustment scheme comprises moving an existing node determined to be in close proximity of the boundary line to be aligned with the boundary line based on a close proximity criterion.

11. The system of claim 10, wherein the close proximity criterion includes:
calculating a reference distance between the existing node and the boundary line;
determining a shortest dimension between the existing node and all neighboring nodes; and
when the reference distance is less than a predefined percentage of the shortest dimension, designating the existing node to be located within close proximity of the boundary line.

12. The system of claim 10, wherein the node adjustment scheme further comprises adding new nodes at each intersection between the boundary line and an edge of a rigid element.

13. The system of claim 12, wherein the node adjustment scheme further comprises splitting each rigid element that is dissected by the boundary line.

14. The system of claim 12, wherein the initial geometry comprises the part's desired geometry.

15. A non-transitory computer readable medium containing computer executable instructions of designing geometry of a tool set in a numerical simulation of sheet metal forming operations including effects of springback compensation by a method comprising:
(A) generating, with an application module installed on a computer system, a computerized die face model representing an initial geometry of a tool set for forming a sheet metal work-piece to a part, the computerized die face model containing a plurality of nodes connected by a plurality of rigid elements;
(B) conducting, with the application module, a numerically simulated deep drawing operation for using the computerized die face model to numerically deform the sheet metal work-piece according to a current geometry of the tool set;
(C) conducting, with the application module, a numerically simulated trimming operation for trimming off unwanted portions of the deformed sheet metal work-piece if required;
(D) conducting, with the application module, a numerical springback simulation for obtaining a trial geometry of the part, the trial geometry includes a springback effect either of the deformed sheet metal work-piece or of the trimmed deformed sheet metal work-piece if the trimming operation is required;
(E) determining, with the application module, a deviation due to springback by comparing the trial geometry to the part's desired geometry;
(F) when the deviation due to springback is outside of a predetermined tolerance, regenerating, with the application module, the computerized die face model based on a modified geometry of the tool set that includes an estimated amount of springback compensation derived from the deviation together with a node adjustment scheme for ensuring model conformity along a boundary line of the part; and (G) repeating actions (B)-(F) unless the deviation due to springback is within the predetermined tolerance.

16. The non-transitory computer readable medium of claim 15, wherein the estimated amount of springback compensation comprises an opposite amount of the deviation due to springback.

17. The non-transitory computer readable medium of claim 15, wherein the node adjustment scheme comprises moving an existing node determined to be in close proximity of the boundary line to be aligned with the boundary line based on a close proximity criterion.

18. The non-transitory computer readable medium of claim 17, wherein the close proximity criterion includes:

calculating a reference distance between the existing node and the boundary line;

determining a shortest dimension between the existing node and all neighboring nodes; and when the reference distance is less than a predefined percentage of the shortest dimension, designating the existing node to be located within close proximity of the boundary line.

19. The non-transitory computer readable medium of claim 17, wherein the node adjustment scheme further comprises adding new nodes at each intersection between the boundary line and an edge of a rigid element.

20. The non-transitory computer readable medium of claim 19, wherein the node adjustment scheme further comprises splitting each rigid element that is dissected by the boundary line.

* * * * *